(12) United States Patent
Bayer et al.

(10) Patent No.: US 11,697,242 B2
(45) Date of Patent: Jul. 11, 2023

(54) METHOD TO ADDITIVE MANUFACTURE BIOCOMPATIBLE MATERIAL AND ARTICLES MADE BY THE METHOD

(71) Applicant: Dow Global Technologies LLC, Midland, MI (US)

(72) Inventors: Roland Bayer, Walsrode (DE); Aleksander J. Pyzik, Midland, MI (US); Sharon Allen, Midland, MI (US); Scott T. Matteucci, Midland, MI (US)

(73) Assignee: Nutrition & Biosciences USA 1, LLC, Rochester, NY (US)

( * ) Notice: Subject to any disclaimer, the term of this patent is extended or adjusted under 35 U.S.C. 154(b) by 0 days.

(21) Appl. No.: 15/747,792

(22) PCT Filed: Jul. 20, 2016

(86) PCT No.: PCT/US2016/043044
§ 371 (c)(1),
(2) Date: Jan. 26, 2018

(87) PCT Pub. No.: WO2017/019393
PCT Pub. Date: Feb. 2, 2017

(65) Prior Publication Data
US 2018/0222111 A1    Aug. 9, 2018

Related U.S. Application Data

(60) Provisional application No. 62/197,113, filed on Jul. 27, 2015.

(51) Int. Cl.
*B29C 64/118* (2017.01)
*C08L 1/28* (2006.01)
(Continued)

(52) U.S. Cl.
CPC .......... *B29C 64/118* (2017.08); *B29C 64/40* (2017.08); *B33Y 70/00* (2014.12); *C08J 11/08* (2013.01);
(Continued)

(58) Field of Classification Search
CPC ..... B29C 64/40; B29C 64/245; B29C 63/118; C08J 11/08; C08L 1/28
See application file for complete search history.

(56) References Cited

U.S. PATENT DOCUMENTS 2,145,273 A    1/1939  Peterson et al.
3,844,706 A *  10/1974  Tsaras .................... C11C 5/002
                                                  431/288
(Continued)

FOREIGN PATENT DOCUMENTS

WO        2006020279 A2    2/2006
WO    WO-2014014752 A1 *  1/2014 ............. A61K 9/146
(Continued)

OTHER PUBLICATIONS

Sidley Chemical, Ethyl Cellulose, Feb. 1, 2015, Sidley Chemical (Year: 2015).*
(Continued)

*Primary Examiner* — Francisco W Tschen
*Assistant Examiner* — Elisa H Vera

(57) ABSTRACT

A method of additive manufacturing is comprised of providing a material comprised of a ethyl cellulose polymer having an ethoxy content of 43% to 52% by mass and a plasticizer. The material is heated and dispensed through a nozzle to form an extrudate deposited on a base. The base, nozzle or combination thereof is moved while dispensing the material so that there is horizontal displacement between the base and nozzle in a predetermined pattern to form an initial layer of the material on the base and successive layers of the
(Continued)

material are adhered on the initial layer to form an additive manufactured part by repeating the aforementioned steps. The article formed of the ethyl cellulose polymer may be used in many applications such as those related to the pharmaceutical and food industries.

18 Claims, 1 Drawing Sheet

(51) Int. Cl.
    *B33Y 70/00*     (2020.01)
    *B29C 64/40*     (2017.01)
    *C08J 11/08*     (2006.01)
    *B33Y 70/10*     (2020.01)

(52) U.S. Cl.
    CPC ........ *C08L 1/28* (2013.01); *B29K 2995/0056* (2013.01); *B33Y 70/10* (2020.01)

(56) References Cited

U.S. PATENT DOCUMENTS

| | | |
|---|---|---|
| 4,575,330 A | 3/1986 | Hull |
| 4,612,355 A | 9/1986 | Belz |
| 4,845,206 A | 7/1989 | Thomson et al. |
| 4,870,148 A | 9/1989 | Belz et al. |
| 5,121,329 A | 6/1992 | Crump |
| 5,136,515 A | 8/1992 | Helinski |
| 5,260,009 A * | 11/1993 | Penn ................. H05K 3/125 264/401 |
| 5,340,433 A | 8/1994 | Helinski |
| 5,503,785 A | 4/1996 | Crump et al. |
| 5,597,589 A | 1/1997 | Deckard |
| 5,649,277 A | 7/1997 | Greul et al. |
| 6,070,107 A | 5/2000 | Lombardi et al. |
| 6,437,034 B2 | 8/2002 | Lombardi et al. |
| 7,534,386 B2 | 5/2009 | Priedeman, Jr. |
| 7,754,807 B2 | 7/2010 | Priedeman, Jr. et al. |
| 8,227,540 B2 | 7/2012 | Priedeman et al. |
| 8,246,888 B2 | 8/2012 | Hopkins et al. |
| 8,535,049 B2 | 9/2013 | MacLeod |
| 8,822,590 B2 | 9/2014 | Hermes et al. |
| 10,100,168 B2 * | 10/2018 | Bayer ................. B33Y 70/00 |
| 10,201,933 B2 * | 2/2019 | Bayer ................. B33Y 70/00 |
| 2004/0029750 A1 * | 2/2004 | Schudel ............... A61Q 19/10 510/101 |
| 2005/0025905 A1 * | 2/2005 | Pan .................... B33Y 40/00 427/558 |
| 2005/0069655 A1 * | 3/2005 | Yamamoto ............ B41M 5/508 428/32.18 |
| 2010/0203130 A1 * | 8/2010 | Tygesen ............... A61K 9/4816 424/474 |
| 2013/0193621 A1 * | 8/2013 | Daya .................. A61K 9/2072 264/401 |
| 2013/0317164 A1 | 11/2013 | Hermes et al. |
| 2014/0328884 A1 * | 11/2014 | Reyes .................. B29C 47/92 424/401 |
| 2015/0093552 A1 * | 4/2015 | Biskop ................. B29C 64/245 428/201 |
| 2015/0165041 A1 * | 6/2015 | Thompson ............ B29C 48/30 514/282 |
| 2015/0182990 A1 * | 7/2015 | Binner ................. B29C 39/123 428/478.2 |
| 2015/0335592 A1 * | 11/2015 | Barnscheid ............ A61P 29/00 514/646 |
| 2016/0136887 A1 * | 5/2016 | Guillemette .......... B29C 69/001 428/375 |

FOREIGN PATENT DOCUMENTS

| | | |
|---|---|---|
| WO | 2015108768 A1 | 7/2015 |
| WO | 2015108770 A1 | 7/2015 |

OTHER PUBLICATIONS

Zhang et al, Developing hydroxypropyl methylcellulose/hydroxypropyl starch blends for use as capsule materials, Apr. 12, 2013, Elsevier (Year: 2013).*
Lothar Brandt et al: "Cellulose Ethers", Ullmann's Encyclopedia of Industrial Chemistry, 1986, pp. 461-485, Chapter 8, vol. A5.
Deng Guang Yu et al: "Tablets With Material Gradients Fabricated by Three-Dimensional Printing", Journal of Pharmaceutical Sciences, vol. 96, No. 9, Sep. 1, 2007 (Sep. 1, 2007), pp. 2446-2456.
Dow Cellulosics Ethocel Ethylecellulose Polymers Technical Handbook.

* cited by examiner

METHOD TO ADDITIVE MANUFACTURE BIOCOMPATIBLE MATERIAL AND ARTICLES MADE BY THE METHOD

FIELD OF THE INVENTION

The invention relates to a material and method of additive manufacturing of biodegradable and biocompatible polymers. In particular, the invention is an additive manufacturing method for forming ethyl cellulosic parts and the parts made therefrom.

BACKGROUND OF THE INVENTION

Additive manufacturing of thermoplastic polymers is well known. For example, fused filament fabrication (FFF), which is also commonly called plastic jet printing has been used to form 3D parts by using thermo-plastic filaments that are drawn into a nozzle heated, melted and then extruded where the extruded filaments fuse together upon cooling (see, for example, U.S. Pat. Nos. 5,121,329 and 5,503,785). Because the technique requires melting of a filament and extrusion, the materials have been limited to thermoplastic polymers and complex apparatus. In addition, the technique has required support structures that are also extruded when making complex parts that must survive the elevated temperature needed to form the part, while also being easily removed, for example, by dissolution.

Selective laser sintering or melting (SLS or SLM) has been used to make 3D parts by selectively sintering powders in a bed of powder (see, for example, U.S. Pat. No. 5,597,589). In this method a bed of powder maintained at elevated temperatures is selectively sintered using a $CO_2$ laser. Once a first layer has been sintered, a further layer of powder is metered out and the selective sintering repeated until the desired 3D part is made. Since the powder must be sintered or melted, SLS has been limited by the need for complex apparatus and use of thermoplastic polymers with very particular characteristics to allow for sintering without warping, slumping and achieve desired fusing particularly between layers. This generally has limited the applicability mostly to polyamides (i.e., nylon) or composite powders containing nylon.

Stereolithography (SLA) or photosolidification has also been used to make polymeric parts (see, for example, U.S. Pat. No. 4,575,330). SLA builds up successive layers from a photocurable resin contained in a vat using a UV laser. The part being manufactured is supported by a platen within the vat which moves down as each layer is photocured to form the part. Just as for SLS and FFF, SLA is limited to particular photocurable polymeric resins and requires complex apparatus to form the parts.

It would be desirable to provide an additive manufacturing method and parts made therefrom that avoid one or more of the problems of the prior art such as those described above. Likewise, it would be desirable to provide an additive manufacturing method, material for use in such a method and parts that have biodegradable properties.

SUMMARY OF THE INVENTION

A first aspect of the invention is a method of additive manufacturing comprising,
(i) providing a material comprised of a ethyl cellulose polymer having an ethoxyl content of 43% to 52% and a plasticizer,
(ii) heating and dispensing said material through a nozzle to form an extrudate deposited on a base,
(iii) moving the base, nozzle or combination thereof while dispensing the material so that there is horizontal displacement between the base and nozzle in a predetermined pattern to form an initial layer of the material on the base, and
(iv) repeating steps (ii) and (iii) to form a successive layer of the material adhered or fused on the initial layer to form an additive manufactured part.

A second aspect of the invention is an additive manufactured article comprised of at least two layers of a plurality of material extrudates fused together, wherein the material extrudates are comprised of a ethyl cellulose polymer having an ethoxyl content of 43% to 50% by weight and a plasticizer.

The improved additive manufacturing method may be used to form an additive manufactured biodegradable and even biocompatible (ingestible) part, which may be used for multiple applications, including, but not limited to, industrial, health, nutritional, pharmaceutical and the like.

DETAILED DESCRIPTION OF THE INVENTION

Figure 1:
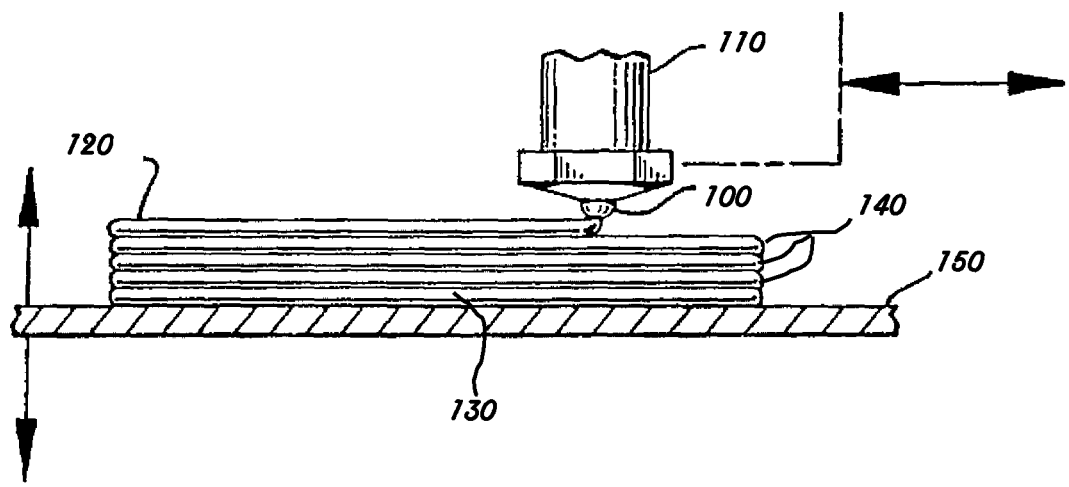
FIG. 1 is a side view of the additive manufactured article of this invention being made by the method of this invention.

The invention's method of additive manufacturing involves providing a material comprised of an ethyl cellulose polymer having an ethoxyl content of 43% to 52% by mass and a plasticizer. The ethyl cellulose polymer (also typically referred to as ethyl cellulose) is one that is insoluble in water. The ethyl cellulose polymer, desirably has an ethoxyl content of at least 44% or 45% to at most 51 or 50%. Suitable ethyl cellulose polymers include ETHOCEL cellulose ethers available from The Dow Chemical Company, Midland, Mich. and AQUALON ethyl cellulose available from Ashland Inc., Wilmington, Del. The mass % of the ethoxyl content and its relation to degree of substitution is well known and described by Ullmann's Encyclopedia of Industrial Chemistry, "Cellulose Ethers", Chapter 8, Vol. A5 (1986).

Generally, the ethyl cellulose polymer has a solution viscosity of 2 to 400 centipoise (cP), the solution being 5% by weight of the ethyl cellulose polymer in an 80% toluene-20% ethanol by weight solution. The viscosity is measured using an Ubbelohde viscometer. Preferably, the ethyl cellulose polymer has a solution viscosity of at least about 4, 10 or 20 to at most about 300 or 250 cP.

The ethyl cellulose polymer is generally soluble in organic solvents such as alcohol, aromatic hydrocarbon, cycloaliphatic hydrocarbon, chlorinated aliphatic hydrocarbon, chlorinated aromatic hydrocarbon, ether, ketone, combination thereof, or mixture thereof. The ethyl cellulose polymer typically is soluble, for example, in benzyl alcohol, phenyl ethyl alcohol, methyl alcohol, isopropyl alcohol, butyl alcohol, acetone, toluene, methylene chloride or mixture of these.

Even though the ethyl cellulose polymer is thermoplastic on its own, when making additive manufactured parts, the ethyl cellulose polymer requires a plasticizer to realize sufficient ductility to realize a crack free part and extrudate. The plasticizer may be any of those known in the art useful to plasticize ethyl cellulose polymers. Exemplary plasticizers include phosphates, glycerides and esters of higher fatty acids and amides, glycol esters of coconut oil fatty acids, acetylated monoglyceride, glycerine, dibutyl phthalate, diphenyl phthalate, castor oil, dicylclohexyl phthalate, butyl phthalyl, butyl glycolate, butyl ricinoleate, cresyldiphenyl phosphate, butyl stearate, benzyl phthalate, triethylcitrate, dibutylsebacate, sorbitol and triacetin or mixture thereof. D-sorbitol, triethylcitrate or mixture thereof are particularly suitable.

The amount of plasticizer may be any amount that results in the ethyl cellulose polymer being able to be extruded into additive manufactured parts without cracking. Generally, the amount may be from about 0.1% to 50% by weight, but typically is at least about 0.5%, 1%, 2%, 5%, 10%, 15% or 20% to about 45%, 40%, 25% or 30%.

The material may also be comprised of a filler that assists in the imparting of a desired property such as rheological, mechanical, coloration, or other function. Examples of fillers include inorganic particulates (e.g., carbon black, calcium carbonate, titanium oxide, carbon nanotubes, clays and talc) and organic particulates (e.g., sugar, flour, and starch) and organic compounds, including, for example, dyes and pigments.

The amount of filler suitable may be determined for a given filler and prepolymer molecular weight, by routine experimentation. Typically, the amount of filler is at least in ascending desirability, 10%, 15%, 18%, 23 or 25% to at most, in ascending desirability, 38%, 35%, 32%, 30% or 28% by weight of the material.

The material may also be comprised of other useful components such as filler, drug, food, dye, lubricant, surfactant, stabilizer, antioxidant or mixture thereof.

Turning to FIG. 1, the method comprises heating (not shown) and dispensing the material through nozzle 100 attached to the nozzle assembly 110. Upon dispensing, the material forms an extrudate 120 that forms an initial layer 130 and successive layers 140 on base 150. Nozzle assembly 110 is depicted being orthogonal to base, but may be set at any useful angle to form the extrudate whereby the extrudate 120 and nozzle assembly 110 form an obtuse angle with the extrudate 120 being parallel to the base. In addition, the nozzle assembly 110 may be rotated about its longitudinal axis, for example, to reorient the shape of the opening in the nozzle 100.

The relative motion of the base 150 and nozzle assembly 110 are also shown, but it is understood that the base 150, nozzle assembly 110 or both may be moved to cause the relative motion in any horizontal direction or vertical direction. The motion is made in a predetermined manner, which may be accomplished by any known CAD/CAM methodology and apparatus such as those well known in the art and readily available robotics or computerized machine tool interface. Such pattern forming is described, for example, in U.S. Pat. No. 5,121,329.

The extrudate 120 may be dispensed continuously or disrupted to form the initial layer 130 and successive layers 140. If disrupted extrudates 120 are desired, the nozzle may be comprised of a valve (not pictured) to shut off the flow of the material. Such valve mechanism may be any suitable such as any known electromechanical valves that can easily be controlled by any CAD/CAM methodology in conjunction with the pattern.

Because the material may be sticky due to heating, the base 150 may be a low surface energy material such as a polyolefin (e.g., polyethylene or polypropylene) or fluorinated polymer such as Teflon and the like. Alternatively, the base may have a mold release agent such as those known in the polyurethane reaction injection molding art or the base may have a sheet of paper or film of a low energy material placed upon it prior to dispensing and forming the additive manufactured part.

More than one nozzle assembly 110 may be employed to make composite or gradient structures within the additive manufactured part. Likewise, a second nozzle assembly 110 may be employed to dispense a support structure that may be later removed so as to allow more complex geometries to be formed such as described in U.S. Pat. No. 5,503,785. That is the method further comprises providing a second material that dissolves in a solvent in which the material does not dissolve, wherein the heating, dispensing, moving and repeating are performed using the material and second material such that the additive manufacture part is comprised of the material and second material. The method may then also comprise removing the material or the second material to form the additive manufactured article. The material or second material is desirably removed by dissolving one or the other with a solvent that does not dissolve the other.

In a particular embodiment, the method is performed with the material comprised of the ethyl cellulose polymer and plasticizer and a second material using a separate nozzle as described above. The second material is one in which it dissolves in a solvent that the material comprised of the ethyl cellulose polymer does not. That is, the second material is generally comprised of a polymer that dissolves in a solvent in which the ethyl cellulose polymer does not. Desirably, the second material or polymer comprising the second material dissolves in water. In a preferred embodiment the second material is used as a support for the material comprised of the ethyl cellulose polymer and plasticizer to make more complex shaped additive manufactured articles. Examples of polymers that may comprise the second material include waxes, hydroxypropyl methyl cellulose, poly(2-ethyl-2-oxazoline) and impact modified terpolymers of styrene, methacrylic acid and butyl acrylate commercially available under BELLAND 88140 and a copolymer comprised of maleic anhydride. The second material is preferably comprised of: a hydroxypropyl methyl cellulose, hydroxyethyl methyl cellulose or mixture thereof. The hydroxypropyl methylcellulose is desirably a hydroxypropyl methylcellulose (HPMC) having a DS of at least 1.0 and an MS of at least 0.6, wherein DS is the degree of substitution of methoxyl groups and MS is the molar substitution of hydroxypropoxyl groups, further described in co-pending international application No. PCT/US15/010746 incorporated herein by reference. The hydroxyethyl methylcellulose is desirably a hydroxyethyl methylcellulose having a DS of 1.8 to 2.5 and an MS of at least 0.5 to 2.5, wherein DS is the degree of substitution of methoxyl groups and MS is the molar substitution of hydroxyethoxyl groups further described in U.S. provisional application No. 62/172,850 incorporated herein by reference. The second material may also be comprised of a plasticizer, filler and other additives as described for the material.

When the second material is comprised of the aforementioned HPMC and HEMC, it is advantageous to dissolve it (HPMC) in water having a lower temperature such as less than 30° C. Preferably the temperature of the water is around ambient temperature (e.g., 22° to 28° C.).

In another embodiment the second material is comprised of the HPMC and HEMC described above and the material comprised of the ethyl cellulose polymer and plasticizer is dissolved to form the additive manufactured article. In this case, said article may be useful for applications where water solubility is desired in the end product.

When using the method, an additive manufactured article can be formed comprised of at least two layers of a plurality of material extrudates fused together, wherein the material extrudates are comprised of a cellulosic ether polymer having an ethoxyl content of 43% to 52% by weight and a plasticizer. Surprisingly, said article may be made free of cracks and sufficient elasticity to be used in a myriad of applications. In a particular embodiment, said article has a Young's modulus of 0.1 to about 4 GPa. Likewise, the article desirably has a tensile elongation at break that is a least about 7% to 41%. Said article may also be biocompatible (ingested) allowing the article employed in pharmaceutical or food related applications in which a drug or food may be incorporated or added to the manufactured article.

EXAMPLES

Unless otherwise mentioned, all parts and percentages are by weight. In the Examples the following test procedures are used. All printing was done using a MakerBot Replicator 2x Experimental™ printer (MakerBot Industries LLC, One MetroTech Center, 21st Floor, Brooklyn, N.Y. 11201). Temperature ranges investigated ranged from 100° C. to 250° C. which is the maximum temperature for the equipment.

Three ethyl cellulose polymers (ETHOCEL cellulose ether std grades 4, 45 and 300 each having an ethoxyl content of 48-49.5%, available from The Dow Chemical Company, Midland Mich.) were heated to a temperature where the ETHOCEL flowed, mixed with plasticizers and extruded into 1.75 mm diameter filaments for printing experiments. The compositions, testing results and print quality are shown in Table 1. Temperatures of the nozzle and print platform were varied to determine the minimum and maximum temperature conditions needed to print the filament (i.e., get good quality printed parts as detailed below).
Print Quality Rating:
Print quality was assessed using the following ratings.

Category 1. Printed surface is intact and has no visible flaws by eye. Good adhesion between individual lines and layers.

Category 2. Printed surface may have occasional small holes or gaps in print lines. Good adhesion between lines and layers.

Category 3. Surface has occasional larger gaps (mm or greater) in printing. Good adhesion between layers.

Category 4. Printed surface has holes and gaps in printed lines, not all infill is covered. There is a lack of adhesion between layers.

Category 5. Layers and print lines do not adhere to each other or build plate.
Filament Bendability:

Bendability helps to describe how flexible the filament is and ultimately how tolerant the filament will be to handling. It is defined as the area of the smallest circle that the filament (1.75 mm diameter) can be bent into before the filament breaks. The more flexible the filament is, the smaller the area is given in cm2.
Filament % Elongation and Tensile Strength:

% Elongation and Tensile Strength Mechanical testing were determined using an Instron 5542 frame with 500 Newton load and Blue Hill Software, version 3.06. Samples were 75 mm pieces of filament approximately 1.75 mm in diameter. The test speed was 5 mm/min and the gap between the air-powered grips was 2 inches. The average of 5 tested filaments is reported. The method is essentially the same as described in ASTM D638-10 except for substituting a filament for the specified dog-bone shaped test piece geometry.
Filament Loadability:

Loadability describes the ability of the filament to survive being pulled through the feed mechanism of the MakerBot Replicator printer and into the extrusion nozzle. There are 3 categories:

"1" which denotes a filament that could be loaded and printed without the filament breaking.

"2" which denotes that the filament could be loaded into the machine and printed however the movement of the print head caused the filament to break during printing.

"3" which denotes that the filament was crushed by the rollers and could not be fed into the machine.

TABLE 1

| Ex. | Composition | Modulus (GPa) | Extension (%) | Tensile strength (MPa) | Bendability (cm$^2$) | Extrusion Temp. (° C.) | Lowest printable Temp. (° C.) | Loadability | Highest print quality achieved |
|---|---|---|---|---|---|---|---|---|---|
| 1 | 75% Ethocel Std 45 and plasticizer: 15% Triethylcitrate, 10% D-Sorbitol | 1.33 | 2.84 | 18.49 | 2 | 110 | 160 | 1 | 1 |
| 2 | 75% Ethocel Std. 300 and plasticizer: 15% Triethylcitrate, 10% D-Sorbitol | 0.73 | 4.32 | 14.09 | 1 | 110 | 200 | 1 | 1 |
| 3 | 75% Ethocel Std. 4 and plasticizer: 15% triethylcitrate, 10% D-Sorbitol | 0.54 | 2.44 | 7.59 | ND | 120 | 190 | 1 | 2 |
| 4 | 90% Ethocel Std. 4 and plasticizer: 10% dibutylsebacate | 0.45 | 0.90 | 2.62 | 38 | ND | 185 | 2 | 1.5 |
| 5 | 80% Ethocel Std. 4 and 20% plasticizer: 2,4-Dihydroxybenzophenone | 0.90 | 2.36 | 12.56 | 44 | 120 | 165 | 1 | 1.5 |
| 6 | 70% Ethocel Std. 4 and plasticizer: 20% Bis(2-ethyhexyl) adipate, 10% D-Sorbitol | 0.11 | 0.88 | 0.79 | 38 | 100 | 150 | 2 | 3 |
| 7 | 65% Ethocel Std. 4 and plasticizer: 20% Triethylcitrate, 10% D-Sorbitol | 0.20 | 2.55 | 5.00 | ND | 90 | 150 | 2 | 1.5 |
| 8 | 65% Ethocel Std. 4 and plasticizer: 25% Triethylcitrate, 10% D-Sorbitol | 0.17 | 5.17 | 4.98 | 3 | 90 | 150 | 1 | 2.5 |
| Comp. 1 | 100% Ethocel Std. 4 | ND | ND | ND | 20 | ND | could not be printed | 3 | crushed in gearing |

ND = Not determined.

Examples 1-3 used ETHOCEL standard grades 45, 300 and 4 cellulose ethers available from The Dow Chemical Company blended with 15% triethylcitrate and 10% D-sorbitol plasticizer. Each of these Examples was printed with print nozzle temperatures ranging from 145° C. to 200° C. and print bed temperatures from room temperature to 70° C. In each case, the print speed was 80 cm/min and the travel speed was 100 cm/min with a layer height of 0.2 mm and an infill of 10%. Resolution was set to normal. Print quality ranged depending on the particular Example and optimum temperature range was readily determinable. For example, Example 3 ranged from unprintable with no bed adhesion at 160° C. and a room temperature build plate to best quality at 190° C. and a room temperature build plate. Print quality achieved for each of these Examples was a 1 as shown in Table 1.

Examples 4-8 show that other plasticizers may be used with Ethocel standard grade 4 cellulose ether and still achieve reasonable print quality even though the particular combination of triethylcitrate and sorbital gave the best printing results.

Comparative Example 1 shows that ETHOCEL standard grade 4 cellulose ether in the absence of a plasticizer is not able to be printed.

Example 9

A 2 centimeter cube was printed using the composition of Example 3 along with a hydroxypropyl methylcellulose (HPMC) having a DS of 2.0. and an MS of 0.9, wherein DS is the degree of substitution of methoxyl groups and MS is the molar substitution of hydroxypropoxyl groups. This HPMC was prepared and made into a filament as described in co-pending international application No. PCT/US15/010746. When printing the cube, the print layers were alternated between the composition of Example 3 and the HPMC. The print temperature was 190° C. The layers had excellent adhesion and the print quality was a category 1.

Example 10

Example 9 was repeated, except that instead of HPMC, a hydroxyethyl methylcellulose (HEMC) having a DS of 2.07 and an MS of 0.56 was used to print the 1 centimeter cube. This HEMC was prepared as described in U.S. provisional application No. 62/172,850. The print temperature was 190° C. The layers had excellent adhesion and the print quality was a category 1.

Example 11

Example 9 was repeated except that instead of HPMC, polyvinyl alcohol (PVA) filament available from MakerBot (Stratasys). The cube was printed at a temperature between 180 and 190° C. The print quality varied from 1 to 2. The layers were bonded adequately to prevent breaking during easy handling, but the bonding was not nearly as strong as for Examples 9 and 10. Examples 9-11 demonstrate the ability of the cellulose ethers with plasticizers to be co-printed with water soluble polymers to make complex shaped ethyl cellulose parts where the water soluble polymer is the support material or vice versa (i.e., the ethyl cellulose may be removed in a solvent that fails to dissolve the water soluble polymer).

The invention claimed is:

1. A method of additive manufacturing comprising,
(i) providing a material comprised of an ethyl cellulose polymer having an ethoxyl content of 43% to 52% by mass and a plasticizer as a filament,
(ii) heating and extruding said material through an extrusion nozzle to form an extrudate deposited on a base,
(iii) moving the base, extrusion nozzle or combination thereof while extruding the material so that there is horizontal displacement between the base and extrusion nozzle in a predetermined pattern to form an initial layer of the material on the base, and
(iv) repeating steps (ii) and (iii) to form a successive layer of the material adhered on the initial layer to form an additive manufactured part,
wherein the amount of the plasticizer in the material is from about 5% to about 30% by weight and the plasticizer is glycerine, dibutyl phthalate, diphenyl phthalate, dicyclohexyl phthalate, butyl phthalyl, butyl glycolate, cresyldiphenyl phosphate, benzyl phthalate, triethylcitrate, dibutylsebacate, sorbitol, or mixture thereof.

2. The method of claim 1, wherein the method further comprises repeating step (iv) such that a plurality of successive layers are adhered and built up forming the additive manufactured part.

3. The method of claim 1, wherein the ethyl cellulose polymer has a viscosity 2 to 400 centipoise, the viscosity being the viscosity of a 5% by weight solution of the ethyl cellulose polymer in an 80% toluene/20% by weight ethanol solution.

4. The method of claim 1, wherein the material is further comprised of a filler, drug, food, dye, lubricant, surfactant, stabilizer, antioxidant or mixture thereof.

5. The method of claim 1 further comprising providing a second material that is able to be dissolved in a solvent in which the material does not dissolve, wherein the heating, extruding, moving and repeating are performed using the material and the second material such that the additive manufactured part is comprised of the material and the second material.

6. The method of claim 5 further comprising removing the second material from the additive manufactured part by dissolving it in the solvent in which the material does not dissolve.

7. The method of claim 6, wherein the second material is hydroxypropyl methylcellulose, hydroxyethyl methylcellulose or combination thereof and the solvent is water.

8. The method of claim 7, wherein the water temperature is less than 30° C.

9. The method of claim 5 further comprising removing the material from the additive manufactured part by dissolving it in a solvent in which the second material does not dissolve.

10. The method of claim 6 or 9, wherein the second material is hydroxypropyl methylcellulose, hydroxyethyl methylcellulose or combination thereof.

11. The method of claim 10, wherein the hydroxypropyl methylcellulose is a hydroxypropyl methylcellulose having a DS of at least 1.0 and an MS of at least 0.6, and wherein the hydroxyethyl methylcellulose is a hydroxyethyl methylcellulose having a DS of 1.8 to 2.5 and an MS of 0.5 to 2.5.

12. The method of claim 11, wherein the second material is used as a support for the material comprised of the ethyl cellulose polymer and plasticizer.

13. The method of claim 9, wherein the second material is hydroxypropyl methylcellulose, hydroxyethyl methylcellulose or combination thereof, and the solvent is alcohol, aromatic hydrocarbon, cycloaliphatic hydrocarbon, chlorinated aliphatic hydrocarbon, chlorinated aromatic hydrocarbon, ether, ketone, or combination thereof.

14. The method of claim 13, wherein the solvent is methyl alcohol, ethyl alcohol or combination thereof.

15. The method of claim 1, wherein heating is to a temperature from about 120° C. to 220° C.

16. The method of claim 1, wherein the plasticizer is triethylcitrate, sorbitol, or mixture thereof.

17. The method of claim 16, wherein the plasticizer is a mixture of triethylcitrate and sorbitol.

18. The method of claim 17, wherein the amount of the plasticizer in the material is from about 5% to about 25% by weight.

\* \* \* \* \*